No. 670,704. Patented Mar. 26, 1901.
J. J. DAVIN.
CASING ELEVATOR.
(Application filed Nov. 16, 1900.)
(No Model.)
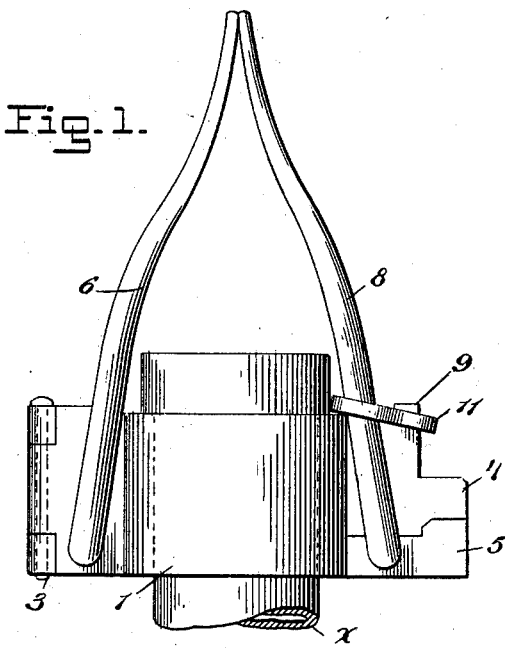
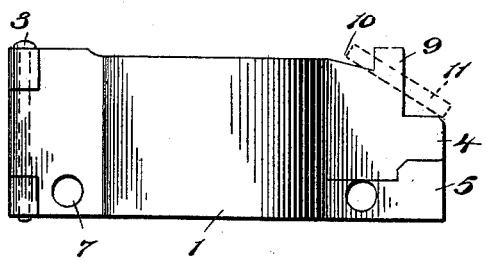
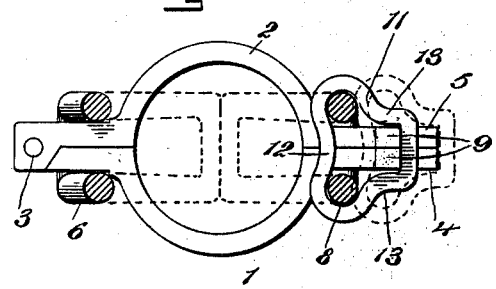
WITNESSES:
INVENTOR
James J. Davin
BY
ATTORNEYS

UNITED STATES PATENT OFFICE.

JAMES JOSEPH DAVIN, OF WASHINGTON, PENNSYLVANIA.

CASING-ELEVATOR.

SPECIFICATION forming part of Letters Patent No. 670,704, dated March 26, 1901.

Application filed November 16, 1900. Serial No. 36,721. (No model.)

*To all whom it may concern:*

Be it known that I, JAMES JOSEPH DAVIN, a citizen of the United States, and a resident of Washington, in the county of Washington and State of Pennsylvania, have invented a new and Improved Casing-Elevator, of which the following is a full, clear, and exact description.

This invention relates to improvements in elevators for casings in oil-wells or the like.

As is well known, the ordinary casing-elevator consists of a collar made in two sections hinged together, a bail attached to the hinged side, and a bail attached to the opposite or free side, with which a locking-link is connected and is designed to drop into a notch. When the casing-hook is adjusted to the bails for the purpose of pulling a joint or joints, an unavoidable lost motion takes place. Then as the hoisting-engine is suddenly started the lost motion is taken up; but at this time another motion takes place—namely, a horizontal swaying until gravity stops it. During the swaying motion the front bail or that attached to the free side reaches the point where its locking-link seeks its recess and is overhead, and the consequence is a different center for the strain is found and one side of the casing-collar bears all the strain or pulls off the casing, which falls down the well, causing considerable expense and possible abandonment of the well.

The object of my invention is to obviate the above-mentioned dangers and difficulties by so constructing the parts that the bail cannot become locked in its outer position; but the swaying motion is permitted until it is stopped by gravity.

I will describe a casing-elevator embodying my invention and then point out the novel features in the appended claim.

Reference is to be had to the accompanying drawings, forming a part of this specification, in which similar characters of reference indicate corresponding parts in all the figures.

Figure 1 is a side elevation of a casing-elevator embodying my invention. Fig. 2 is a side elevation with the bails removed, and Fig. 3 is a top plan view.

The elevator comprises a collar consisting of two sections 1 2, hinged together at one side, as at 3, and having overlapping outer projections 4 5 at the opposite side. A bail 6 has its lower ends turned inward and seated in holes 7, formed in the hinge-wings, and a front bail 8 has its lower ends turned inward and seated in openings in the projections 4 and 5. The upper edges of the projections 4 and 5 have each an upwardly-extended guard-lug 9, and between this guard-lug and the collar the upper edges of said projections are inclined downward and outward, as at 10. A locking-link 11 embraces the bail 8 and also engages around the outer sides of the lugs 9, the link engaging around the outer and inner sides of the members of the bail 8, and the portion 12 of said link between the members or sections of the bail is curved outward and rests or is engaged with and slides upon the incline 10. At the sides outward of the bail members the link is curved inward, as at 13, and the outer end is designed to engage closely against the outer side of the lug or lugs 9.

In operation the elevator-collar is to be engaged around a casing, (indicated by *x* in Fig. 1,) and then after engaging the hooking-tackle with the bails the hoisting motion is started, and, as before stated, there will be a slight lost motion—that is, the bail 8 will swing outward, as will also the link 11. This link 11 will slide down the incline 10, as indicated by dotted lines in Fig. 2, and therefore as there is no notch to receive it, as in the usual construction, it will not be prevented from moving back to the position indicated by full lines in Figs. 1 and 3 as the engine pulls the bails together. Thus it will be seen that there will be no danger of the elevator-collar becoming detached from the casing.

Having thus described my invention, I claim as new and desire to secure by Letters Patent—

A casing-elevator, comprising a sectional collar, the sections being hinged together at one side, projections on the opposite side of the collar, a bail having connection with said projections, a bail having connection with the collar at the hinged side, a lug extended upward from the said projections, an incline extending from the collar to said lug, and a locking-link engaging around the first-named bail and around the lug and adapted to slide on said incline by its engagement with the bail, substantially as specified.

In testimony whereof I have signed my name to this specification in the presence of two subscribing witnesses.

JAMES JOSEPH DAVIN.

Witnesses:
T. JEFF. DUNCAN,
BOYD E. WARNE.